United States Patent [19]

Kadoyashiki

[11] Patent Number: 5,623,641
[45] Date of Patent: Apr. 22, 1997

[54] DISTRIBUTED PROCESSING SYSTEM FOR PERFORMING MEMORY ASSIGNMENT

[75] Inventor: Naozoh Kadoyashiki, Tokyo, Japan

[73] Assignee: NEC Corporation, Tokyo, Japan

[21] Appl. No.: 548,729

[22] Filed: Oct. 26, 1995

[30] Foreign Application Priority Data

Oct. 26, 1994 [JP] Japan .................................. 6-262366

[51] Int. Cl.$^6$ ............................. G06F 12/00; G06F 13/00
[52] U.S. Cl. ................ 395/497.02; 395/475; 395/200.01
[58] Field of Search ..................................... 395/485, 478, 395/494, 550, 475, 200.01, 200.03, 497.01, 497.02, 497.03

[56] References Cited

U.S. PATENT DOCUMENTS

| | | | |
|---|---|---|---|
| 4,528,624 | 7/1985 | Kamionka et al. | 395/650 |
| 4,811,216 | 3/1989 | Bishop et al. | 395/480 |
| 4,881,164 | 11/1989 | Hailpern et al. | 395/417 |
| 5,093,913 | 3/1992 | Bishop et al. | 395/650 |
| 5,159,681 | 10/1992 | Beck et al. | 395/116 |
| 5,517,643 | 5/1996 | Davy | 395/650 |
| 5,548,740 | 8/1996 | Kiyohara | 395/427 |

FOREIGN PATENT DOCUMENTS 5-290001   11/1993   Japan .

*Primary Examiner*—Tod R. Swann
*Assistant Examiner*—Conley B. King, Jr.
*Attorney, Agent, or Firm*—Sughrue, Mion, Zinn, Macpeak & Seas

[57] ABSTRACT

A distributed processing system includes a plurality of processors connected to a transmission line and adapted to respectively execute assigned processes. Each processor includes a transmission/reception processing section, a memory, a memory management section, and a processing section. The transmission/reception processing section transmits/receives data to/from the remaining processors through the transmission line. The memory is used during execution of a process. The memory management section manages the memory. The memory management section ensures an available area in the memory managed by the memory management section of at least one of the remaining processors through the data transmission/reception processing section when a capacity shortage occurs in the memory at the start of a process, and ensures an available area in the memory instead of the available area in the memory of the remaining processor when the available area occurs in the memory during execution of the process. The processing section executes a process by using the available areas in the memory and the memory of the remaining processor which are ensured by the memory management section.

8 Claims, 5 Drawing Sheets

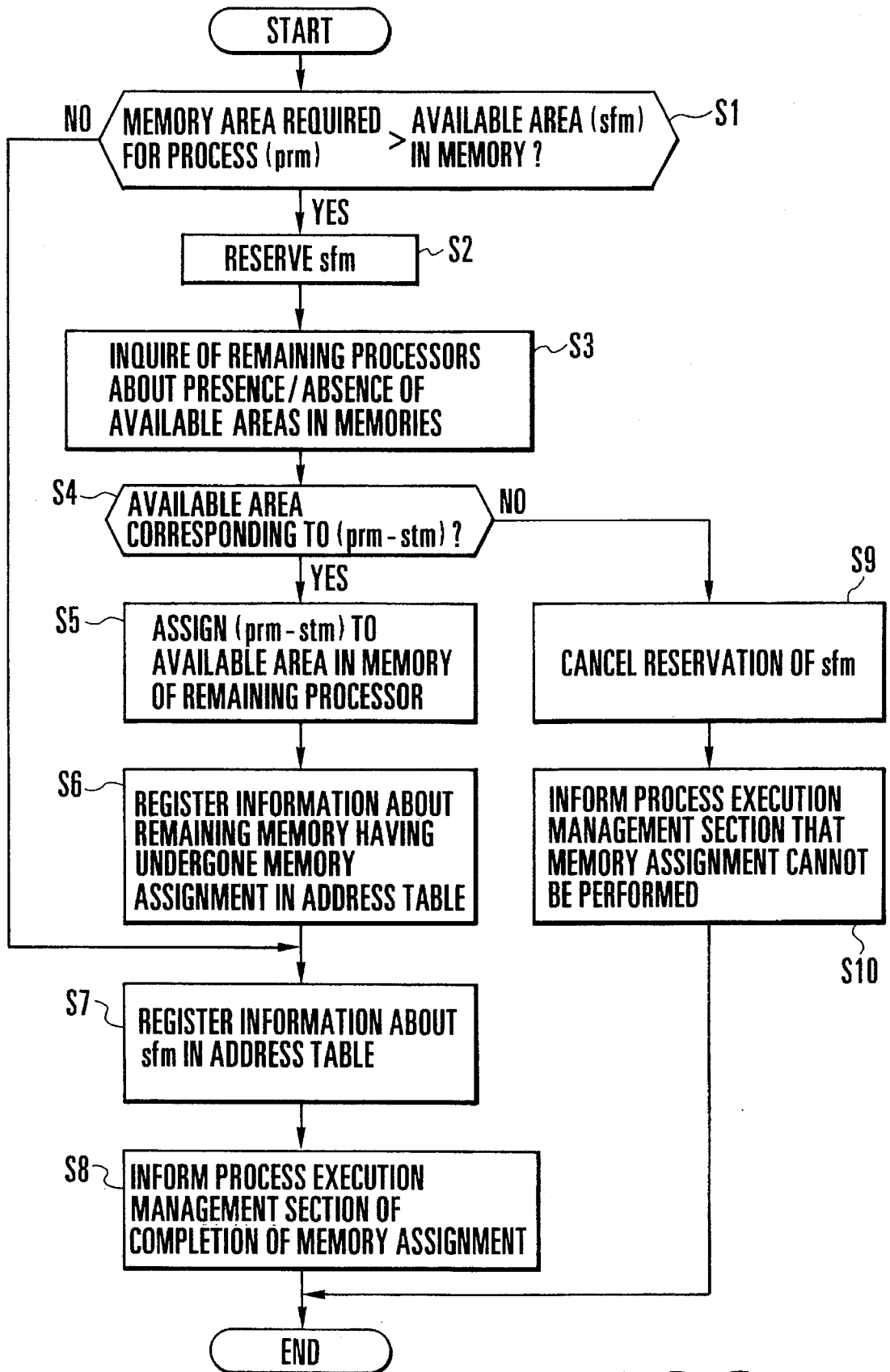
F I G. 3

DISTRIBUTED PROCESSING SYSTEM FOR PERFORMING MEMORY ASSIGNMENT

BACKGROUND OF THE INVENTION

The present invention relates to a distributed processing system in which a plurality of processors having communication functions are connected to each other through a transmission line, and the processors respectively execute assigned processes by using memories while transmitting/receiving data to/from each other.

In a distributed processing system of this type, a plurality of processors respectively execute assigned processes by executing programs. In executing a program, each processor executes a process while accessing the assigned memory.

In general, in such a distributed processing system, each processor cannot access memories other than the assigned memory (first example). According to another system, as disclosed in, e.g., Japanese Patent Laid-Open No. 5-290001, a processor which is executing a program inquires of another processor about the used state of the memory assigned thereto. If the memory has an available area, the processor which has inquired uses the available area instead of its own memory (second example).

In the first example, when a memory shortage occurs in a processor which is executing a program, the processor cannot use a memory area of another processor even if it is available. For this reason, the memory capacity must be increased for each processor. An economical system cannot therefore be realized.

In the second example, each processor can use the memory of another processor. Even if, however, a memory area becomes available in a given processor while it is using the memory of another processor, the given processor must keep using the memory of another processor until the process under execution is completed. In this case, since this processor must access the memory of another processor through a transmission line, it takes time to access the memory. As a result, the execution of the process is delayed.

SUMMARY OF THE INVENTION

It is an object of the present invention to provide a distributed processing system which allows a given processor to efficiently and effectively use the memory of another processor.

In order to achieve the above object, according to the present invention, there is provided a distributed processing system comprising a plurality of processors connected to a transmission line and adapted to respectively execute assigned processes, each of the processors including data transmission/reception means for transmitting/receiving data to/from the remaining processors through the transmission line, a memory used during execution of a process, memory management means for managing the memory, the memory management means ensuring an available area in the memory managed by the memory management means of at least one of the remaining processors through the data transmission/reception means when a capacity shortage occurs in the memory at the start of a process, and ensuring an available area in the memory instead of the available area in the memory of the remaining processor when the available area occurs in the memory during execution of the process, and processing means for executing a process by using the available areas in the memory and the memory of the remaining processor which are ensured by the memory management means.

BRIEF DESCRIPTION OF THE DRAWINGS

FIG. 3 is a flow chart showing the operation of a processor in starting to execute a process;

DESCRIPTION OF THE PREFERRED EMBODIMENT

The present invention will be described below with reference to the accompanying drawings.

Figure 1:
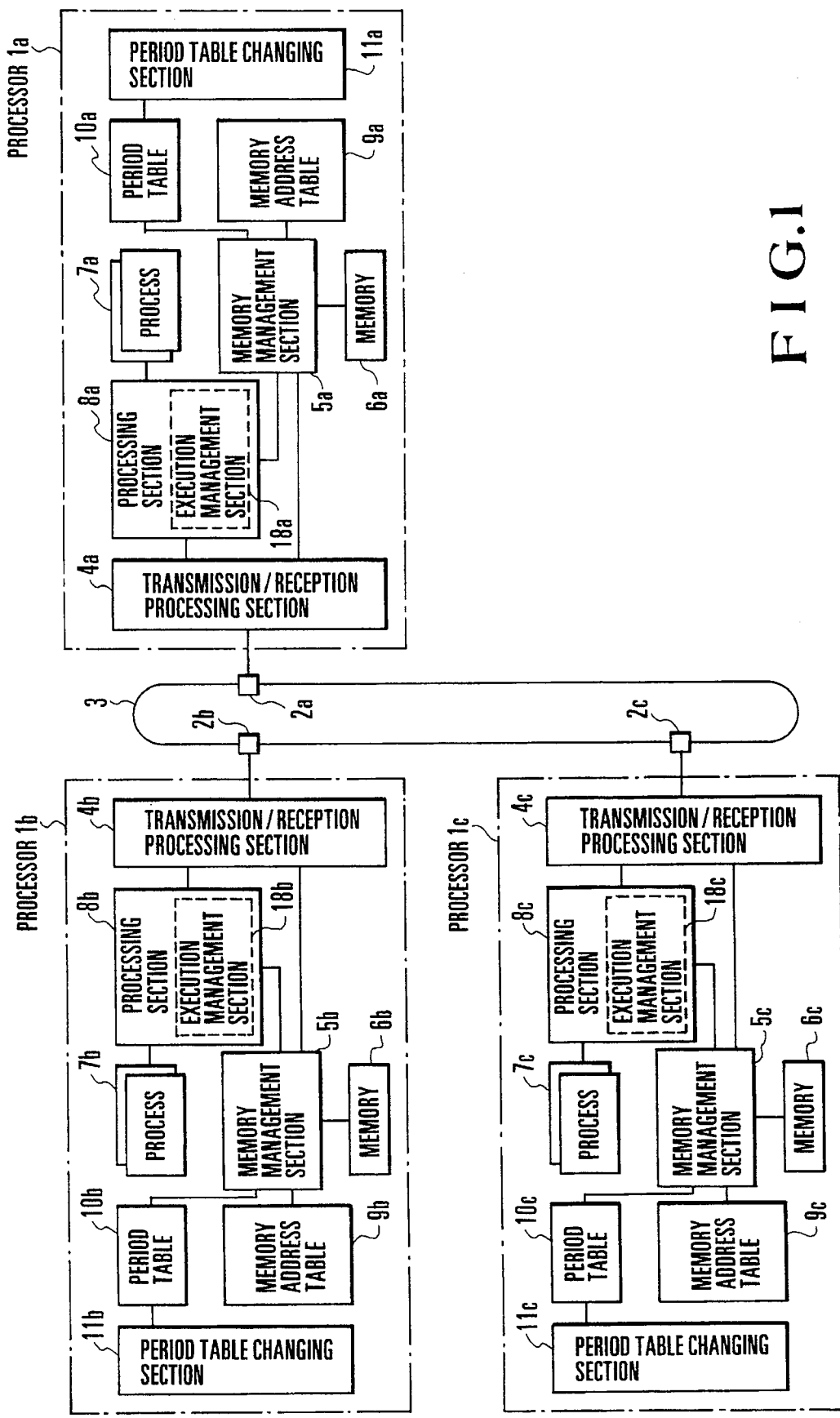
FIG. 1 is a block diagram showing a distributed processing system according to an embodiment of the present invention.

FIG. 1 shows a distributed processing system according to an embodiment of the present invention. As shown in FIG. 1, the distributed processing system is constituted by a plurality of processors $1a$ to $1c$, connection mechanisms $2a$ to $2c$ arranged in correspondence with the processors $1a$ to $1c$, and a transmission line 3 in the form of a loop. The processors $1a$ to $1c$ are connected to the transmission line 3 through the connection mechanisms $2a$ to $2c$. The processors $1a$ to $1c$ transmit data to each other through the transmission line 3, and respectively execute assigned processes.

The processors $1a$ to $1c$ respectively comprise transmission/reception processing sections $4a$ to $4c$ for transmitting/receiving data to/from each other, memory management sections $5a$ to $5c$ for managing memories $6a$ to $6c$ incorporated in the processors $1a$ to $1c$, processing sections $8a$ to $8c$ for executing processes $7a$ to $7c$, memory address tables $9a$ to $9c$ for showing the correspondence between memory addresses to be referred to in executing the processes $7a$ to $7c$ and real memory addresses (physical addresses), period tables $10a$ to $10c$ in which periods at which the available states of the memories of the respective processors are detected during execution of the processes $7a$ to $7c$ are set, and period table changing sections $11a$ to $11c$ for changing the contents of the period tables $10a$ to $10c$. The processing sections $8a$ to $8c$ include execution management sections $18a$ to $18c$ for managing the execution of the processes $7a$ to $7c$.

Figure 5:
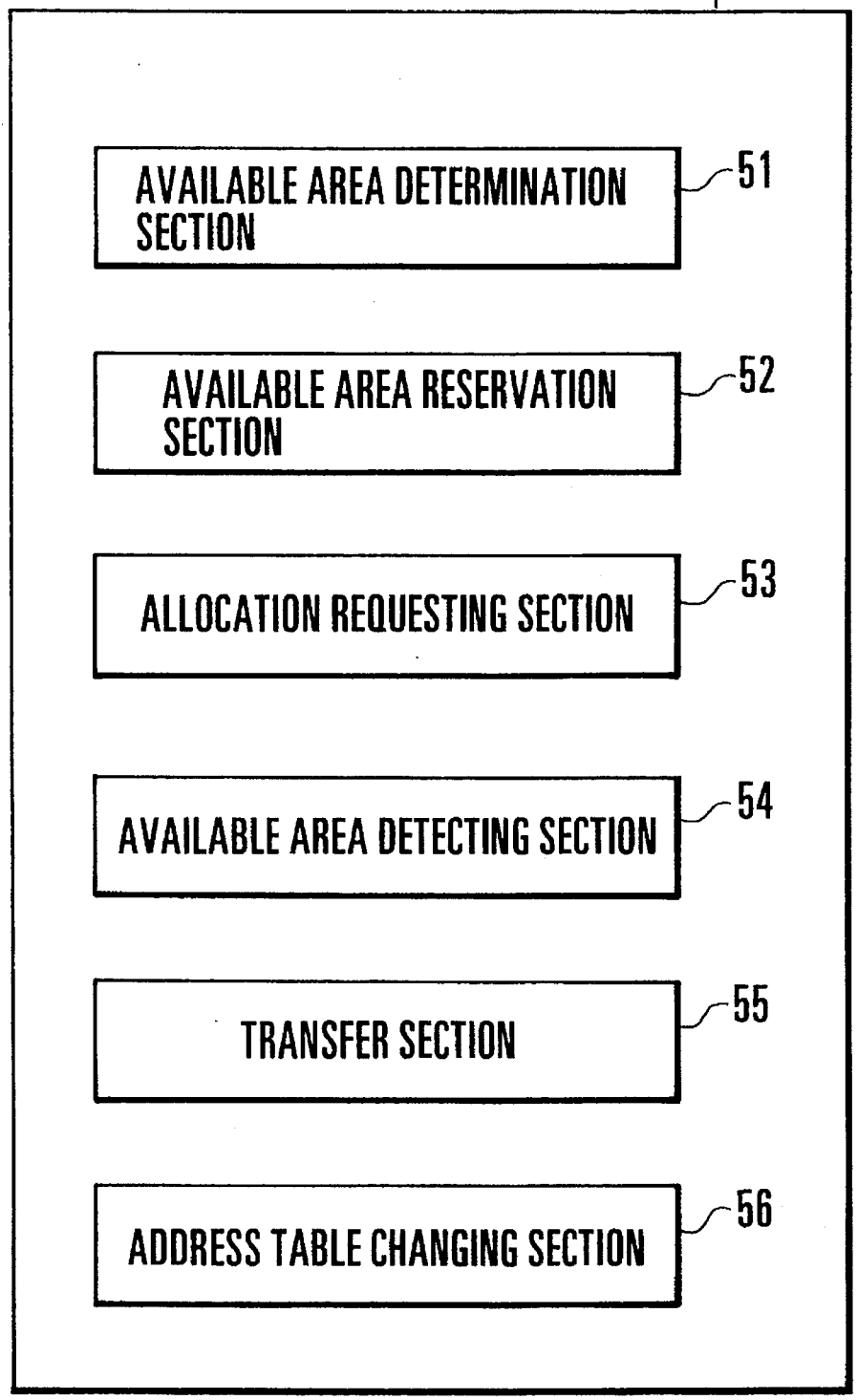
FIG. 5 is a block diagram showing a processing section in FIG. 1.

As shown in FIG. 5, the memory management section $5a$ having the same arrangement as that of the memory management sections $5b$ and $5c$ includes an available area determination section 51, an available area reservation section 52, an assignment requesting section 53, an available area detecting section 54, a transfer section 55, and an address table changing section 56. The available area determination section 51 checks whether the memory capacity required for a process is larger than the available area in the memory $6a$, when the processing section $8a$ starts to execute the process. The available area reservation section 52 reserves and ensures the available area in the memory $6a$ when the determination result from the available area determination section 51 indicates that the memory capacity required for the process is larger than the available area in the memory $6a$. The assignment requesting section 53 requests the memory management sections $5b$ and $5c$ of the remaining processors 1b and 1c to perform assignment of memory areas corresponding to a shortage in the memory capacity required for the process, after the available area in the memory 6a is reserved. The available area detecting section 54 detects and ensures an available area in the memory 6a which is larger than the areas assigned to the memories 6b and 6c of the processors 1b and 1c while the processing section 8a is executing the process. The transfer section 55 copies the contents of the areas assigned to the memories 6b and 6c of the processors 1b and 1c and transfers the copied data to the ensured available area in the memory 6a in accordance with the detection output from the available area detecting section 54. The address table changing section 56 changes the information of the memory address table 9a which is associated with the contents transferred to the available area in the memory 6a to allow the processing section 8a to access the contents.

Figure 2:
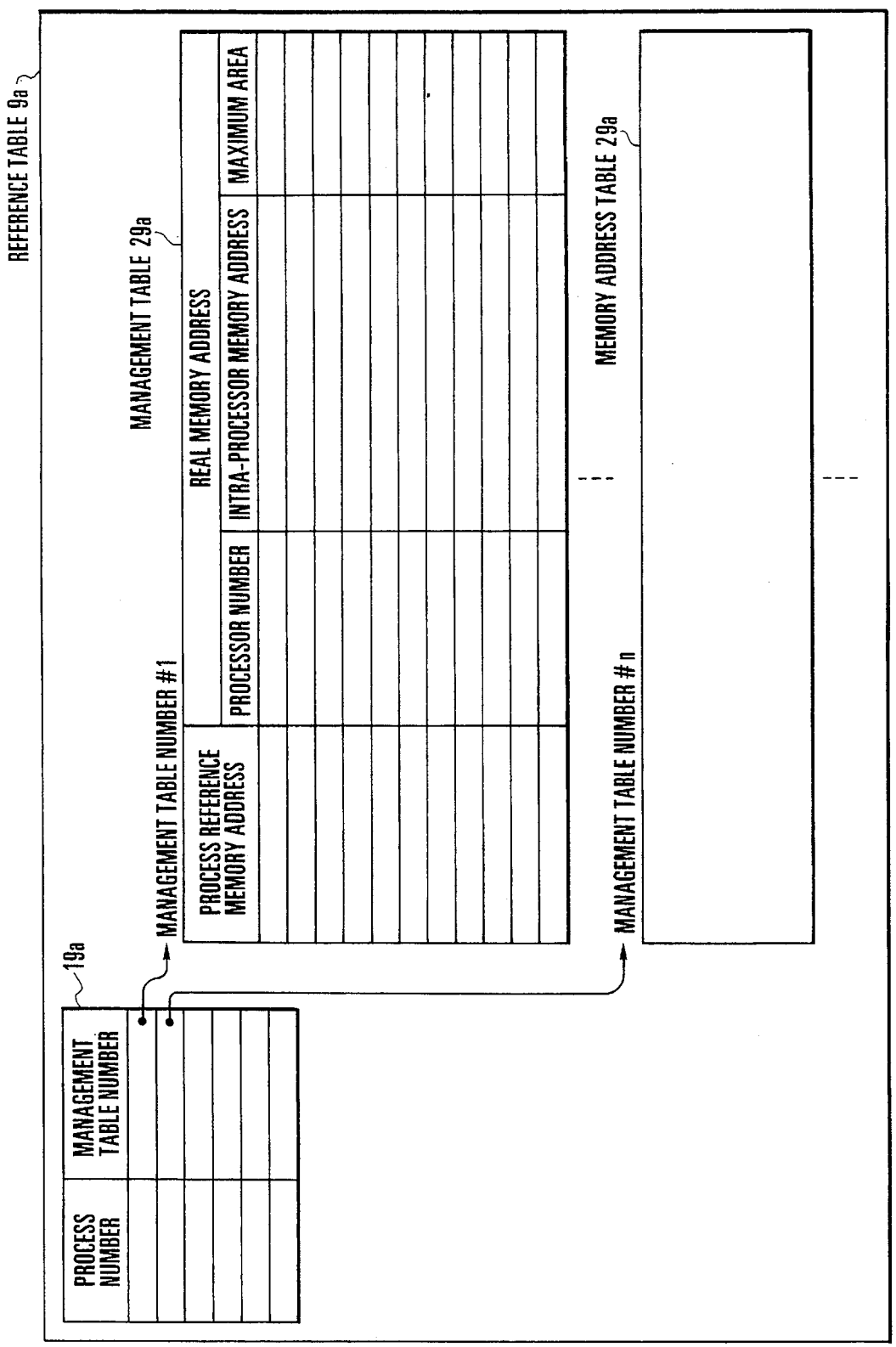
FIG. 2 is a view showing a memory address table in FIG. 1.

FIG. 2 shows the detailed contents of the memory address table 9a described above. The memory address tables 9b and 9c have the same table configuration as that of the memory address table 9a. The memory address table 9a includes a reference table 19a indicating the correspondence between execution process numbers and management table numbers, and a plurality of management tables 29a corresponding to the management table numbers indicated by the reference table 19a. Each of the management tables 29a stores information indicating the correspondence between process reference memory addresses and real memory addresses (physical addresses) constituted by processor numbers, intra-processor memory addresses, and the maximum areas in the corresponding memories.

A case wherein the processor 1a executes the process 7a in the distributed processing system having the above arrangement will be described below. First of all, the execution management section 18a of the processing section 8a requests the memory management section 5a to ensure the memory area required for the process. Upon reception of this request, the memory management section 5a checks the used state of the memory 6a and assigns memory blocks and memory segments to the memory 6a. If the memory capacity required for the process is satisfactorily ensured in the memory 6a after this assignment, the processing section 8a executes the process 7a by using the memory 6a incorporated in the processor 1a.

If the memory capacity required for the process is not ensured after the memory assignment, the memory management section 5a selects the remaining processors 1b and 1c and ensure available areas in the memories 6b and 6c. The processing section 8a executes the process 7a by using the ensured memories 6b and 6c of the remaining processors 1b and 1c.

FIG. 3 shows a memory assigning operation in the present invention, specifically the control operation of the processor 1a at the start of the execution of the process 7a. When the processing section 8a of the processor 1a is to execute a new process, i.e., the process 7a, the execution management section 18a of the processing section 8a requests the memory management section 5a to ensure the memory area required for the process.

In this case, the memory management section 5a checks the used states of the memory blocks and segments of the memory 6a of the processor 1a. In step S1, the available area determination section 51 checks whether the memory capacity (prm) required for the process is larger than the available area (sfm) in the memory 6a. If it is determined that a sufficient memory area for the process cannot be ensured, the available area reservation section 52 reserves and ensures the available area (sfm) in the memory 6a in step S2. In step S3, the assignment requesting section 53 inquires of the remaining processors 1b and 1c about the used states of the memories 6b and 6c through the connection mechanism 2a and the transmission line 3.

In response to the inquiry from the processor 1a, the memory management sections 5b and 5c of the processors 1b and 1c respectively check the used states of the memories 6b and 6c, and return the numbers of memory blocks and segments which are not currently used to the memory management section 5a of the processor 1a. Upon reception of pieces of available area information of the processors 1b and 1c from the processors 1b and 1c, the assignment requesting section 53 checks in step S4 whether a memory shortage (prm−sfm) can be covered by the sum of available areas in the memories 1b and 1c. If YES in step S4, the assignment requesting section 53 requests the memory management sections 5b and 5c to ensure the memory capacity corresponding to the memory shortage (prm−sfm), i.e., the numbers of memory clocks and memory segments which are required for the process.

In this case, if, for example, a sufficient memory capacity for the memory shortage (prm−sfm) can be ensured with only the available area in the memory 6c of the memories 6b and 6c, the assignment requesting section 53 requests the memory management section 5c controlling the memory 6c to ensure all the memory capacity required for the process. If the memory capacity corresponding to the memory shortage (prm−sfm) can be ensured with either of the available areas in the memories 6b and 6c, the assignment requesting section 53 selects one of the memories and requests the required memory capacity of the selected one.

In step S5, the memory management sections 5b and 5c of the processors 1b and 1c respectively assign the memory blocks and segments requested by the processor 1a to the memories 6b and 6c, and informs the memory management section 5a of the assigned memory block numbers and the assigned memory segment numbers. In step S6, the memory management section 5a registers all the information associated with the memories 6b and 6c having undergone memory assignment, i.e., the processor numbers of the processors 1b and 1c whose memories are to be used, memory addresses in the processors 1b and 1c, the sizes of the memory areas to be used, at real addresses. In step S7, the memory management section 5a records memory address information and the like associated with the available area (sfm) in the memory 6a at real addresses in the memory address table 9a. In step S8, the memory management section 5a informs the execution management section 18a of the processing section 8a that the memory assignment is completed.

With this operation, the processing section 8a executes the process 7a in accordance with the assigned memory 6a and the memories 6b and 6c of the remaining processors 1b and 1c.

If it is determined in step S1 that the memory capacity (prm) required for the process is smaller than the available area (sfm) in the memory 6a, the flow advances to step S7 to record memory address information and the like associated with only the available area (sfm) in the memory 6a at real addresses in the memory address table 9a. In step S8, the memory management section 5a informs the execution management section 18a of the processing section 8a that the memory assignment is completed.

If it is determined in step S4 that an available area corresponding to the memory shortage (prm−sfm) is not present in the remaining memories, the memory management section 5a cancels the reservation of the available area (sfm) in the memory 6a in step S9. In addition, in step S10, the memory management section 5a informs the execution management section 18a of the processing section 8a that memory assignment cannot be performed, and ends the process.

If a memory shortage occurs in the memory 6a, the process can be executed by using the memory 6a and the memories 6b and 6c of the remaining processors 1b and 1c in this manner. While the processing section 8a is executing the process by using the memories 6b and 6c of the remaining processors 1b and 1c, the memory management section 5a periodically monitors in accordance with the detection period set in the period table 10a whether any available area is present in he memory 6a of the processor 1a . The detection period in the period table 10a is variably set by the period table changing section 11a.

Figure 4:
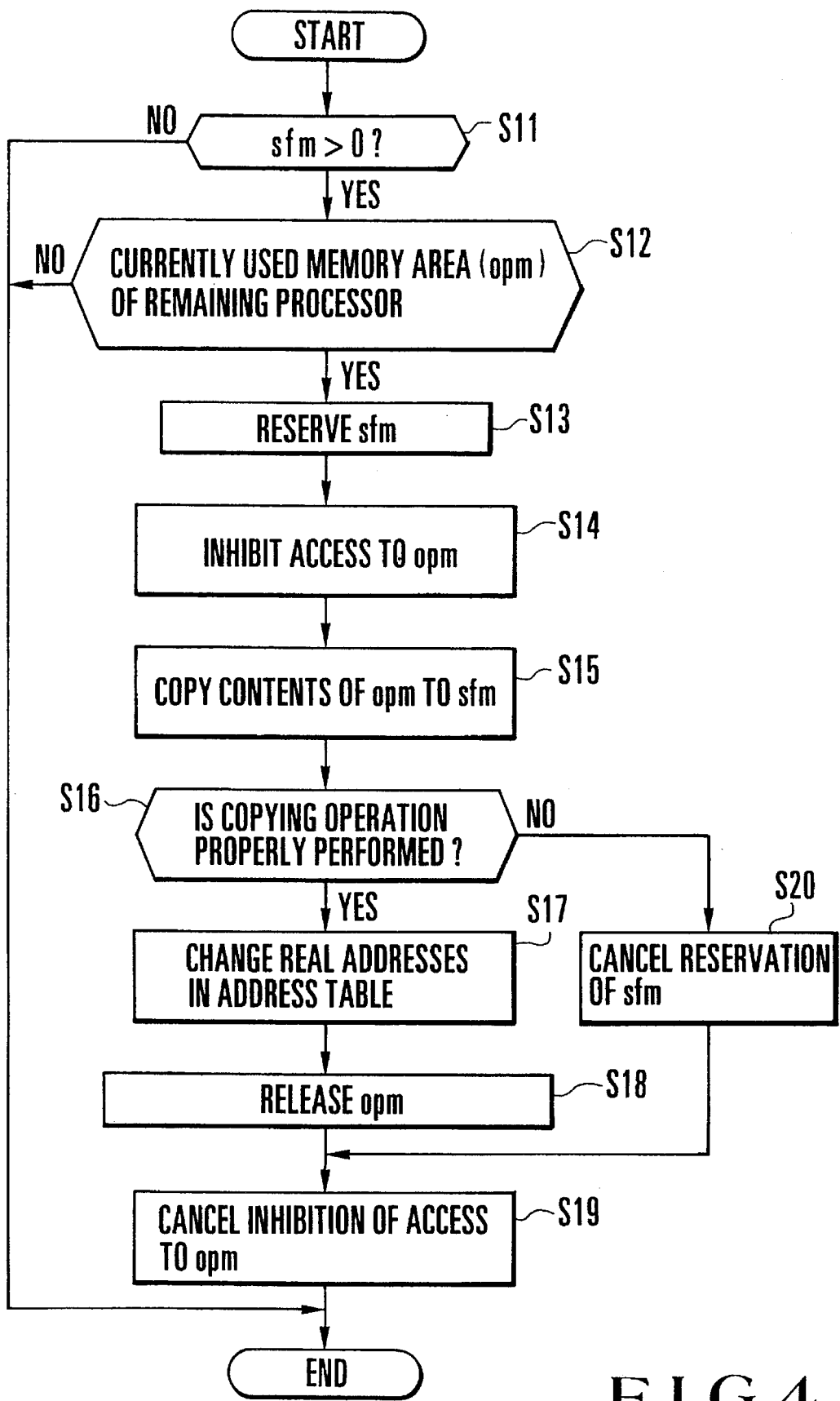
FIG. 4 is a flow chart showing the operation of a processor during execution of a process.

FIG. 4 shows the operation of the processor 1a which is to be performed while the processor 1a is executing a process by using the memories 6b and 6c of the remaining processors 1b and 1c, specifically an operation of switching to the execution of the process 7a to be performed by using only the memory 6a upon detection of the available state of the memory 6a.

In step Sll, the available area detecting section 54 of the memory management section 5a checks the presence/absence of an available area (sfm) in the memory 6a during execution of the process. If it is determined in step Sll that an available area is present in the memory 6a, it is checked in step S12 whether the sum of the areas (opm) in the memories 6b and 6c of the remaining processors 1b and 1c which are currently used by the processing section 8a is smaller than the available area (sfm) in the memory 6a. If it is detected in step S12 that an available area equal to or larger than the sum of the memory areas (opm) assigned to the memories 6b and 6c of the processors 1b and 1c is present in the memory 6a, the memory management section 5a reserves the available area (sfm) in the memory 6a in step S13. In step S14, the memory management section 5a inhibits access to the areas (opm) assigned to the memories 1b and 1c of the remaining processors. In step S15, the memory management section 5a causes the transfer section 55 to copy and transfer the contents of the areas (opm) assigned to the memories 6b and 6c of the processors 1b and 1c to the available area (sfm) of the memory 6a.

It is checked in step S16 whether the copying operation is properly performed. If YES in step S16, the address table changing section 56 performs an address changing operation such that the real addresses in the memory address table 9a coincide with the addresses in the available area (sfm) in the memory 6a. With this operation, the processing section 8a executes the process 7a in accordance with the contents of the memory 6a afterward.

Upon completion of the process, the processing section 8a informs the memory management section 5a of the completion of the process. Upon reception of this information, the memory management section 5a requests the memory management sections 5b and 5c of the processors 1b and 1c, in step S18, to release the memory blocks and segments assigned to the memory management sections 5b and 5c. In step S19, the memory management sections 5b and 5c of the processors 1b and 1c, which have received the information from the memory management section 5a, cancel the inhibition of access to the areas (opm) assigned to the memories which have been used by the processor 1a to perform the process.

If it is determined in step S16 that the contents of the memories 6b and 6c of the processors 1b and 1c cannot be properly copied to the available area in the memory 6a of the processor 1a, the memory management section 5a cancels the reservation of the available area (sfm) in the memory 6a, and also cancels the inhibition of access to the areas (opm) assigned to the memories 6b and 6c of the processors 1b and 1c in step S19.

According to the present invention, if a capacity shortage has occurred in the memory incorporated in a given processor, available areas in the memories incorporated in the remaining processors can be used. A memory capacity larger than the capacity of the memory incorporated in a given processor can therefore be ensured without adding any new memory. In addition, the given processor can use its own memory when an available area occurs during execution of a process, thereby improving the execution efficiency when a plurality of processors for distributed processing respectively execute processes.

Furthermore, since the detection period set in each period table can be sequentially changed in accordance with the size and operation state of the distributed processing system, the processing efficiency of each processor in the distributed processing system of this type can be further improved.

What is claimed is:

1. A distributed processing system comprising a plurality of processors connected to a transmission line and adapted to respectively execute assigned processes, each of said processors including data transmission/reception means for transmitting data to or receiving data from other processors through said transmission line, a first memory used during execution of a process, a first memory management means for managing said first memory, said first memory management means ensuring an available area in another memory managed by another memory management means of at least one of the remaining processors through said data transmission/reception means when a capacity shortage occurs in said first memory at the start of a process, and ensuring an available area in said first memory instead of the available area in said other memory of said at least one of the remaining processors when the available area occurs in said first memory during execution of the process, and processing means for executing a process by using the available areas in said first memory and said other memory of said at least one of the remaining processors which are respectively ensured by said first memory management means and said other memory management means.

2. A system according to claim 1, wherein each of said processors comprises an address table for registering information associated with the available areas in said first memory and said other memory of said at least one of the remaining processors which are respectively ensured by said first memory management means and said other memory management means, and said processing means accesses said first memory and said other memory of said at least one of the remaining processors in accordance with the information in said address table.

3. A system according to claim 2, wherein said memory management means comprises detection means for detecting and ensuring an available area in said first memory which is larger than the area assigned to said other memory of said at least one of the remaining processors during execution of the process, transfer means for transferring contents of the area assigned to said other memory of said at least one of the remaining processors to the ensured available area in said first memory in accordance with a detection output from said detection means, and changing means for changing information in said address table which is associated with the contents transferred to the available area in said first memory to allow said processing means to access the contents.

4. A system according to claim 3, wherein said first memory management means inhibits access to the available area in said first memory which is ensured by said detection means, and cancels the inhibition of access to the area ensured in said first memory upon completion of a transfer operation of said transfer means.

5. A system according to claim 3, wherein each of said processors comprises a period table in which a period at which the available memory area is detected by said detection means during execution of the process is set, and period table changing means for changing the period set in said period table in accordance with a state of said system.

6. A system according to claim 1, wherein said first memory management means comprises determination means for determining, at the start of a process, whether a memory capacity required for the process is larger than an available area in said first memory, reservation means for reserving and ensuring an available area in said first memory in accordance with a determination result from said determination means, and assignment requesting means for requesting said other memory management means of said at least one of the remaining processors to assign a memory area corresponding to a shortage in the memory capacity required for the process so as to ensure an available area fin said other memory of said at least one of the remaining processors upon reservation of the available area in said first memory.

7. A system according to claim 6, wherein said assignment requesting means inquires of said at least one of the remaining processors about the presence or absence of an available area in said other memory, and ensures a memory area corresponding to a shortage in said first memory when an available area in said other memory of said at least one of the remaining processors is not less than a memory capacity corresponding to the shortage.

8. A system according to claim 7, where said remaining processors includes a plurality of processors, and said assignment requesting means inquires of each of said remaining processors about the presence or absence of an available memory area, and separately ensures a memory area corresponding to a shortage in said first memory when the sum of available areas in said other memories of said remaining processors is not less than a memory capacity corresponding to the shortage.

\* \* \* \* \*